United States Patent
Reichert

[11] 3,986,838
[45] Oct. 19, 1976

[54] OXYGEN GENERATOR CELL

[75] Inventor: William H. Reichert, Merritt Island, Fla.

[73] Assignee: Life Support, Inc., Melbourne, Fla.

[22] Filed: May 7, 1975

[21] Appl. No.: 575,461

[52] U.S. Cl. .................................. 23/281; 23/282; 102/39; 222/5
[51] Int. Cl.² .......................... B01J 7/00; B01J 7/02
[58] Field of Search .............. 23/282, 281; 102/39; 60/205; 128/191 R; 222/5, 80

[56] References Cited
UNITED STATES PATENTS

| | | | |
|---|---|---|---|
| 1,892,050 | 12/1932 | Goss | 102/39 X |
| 2,428,425 | 10/1947 | Levitt | 222/5 X |
| 3,736,104 | 5/1973 | Churchill et al. | 23/281 |
| 3,787,074 | 1/1974 | Lewis et al. | 23/281 X |
| 3,806,323 | 4/1974 | Thompson | 23/281 |
| 3,817,302 | 6/1974 | Kowal et al. | 222/5 X |
| 3,856,181 | 12/1974 | Merrell | 222/5 |
| 3,861,880 | 1/1975 | Thompson | 23/282 X |

*Primary Examiner*—Norman Yudkoff
*Assistant Examiner*—Barry I. Hollander
*Attorney, Agent, or Firm*—Hill, Gross, Simpson, Van Santen, Steadman, Chiara & Simpson

[57] ABSTRACT

Chemical oxygen generator cells, for insertion in push pin controlled dispensers and having a conventional steel can housing containing a chlorate candle and a water activated ignition material to start burning of the candle, are provided with a water containing fracturable sealed glass ampoule, capsule, or vial in contact with the ignition material and are protected against inadvertent fracture by an overlying shock cap with a spring diaphragm wall adapted to be depressed by the push pin of the dispenser to crush the glass and release the water to the ignition material. The diaphragm wall acts with a snap action from its overlying protecting position when its center is deflected by the dispenser pin to crush the glass thereby insuring the release of the water to the ignition material only when the dispenser pin is depressed and at all other times protecting the glass against fracture as when the can is dropped or impacted or even dented.

20 Claims, 12 Drawing Figures

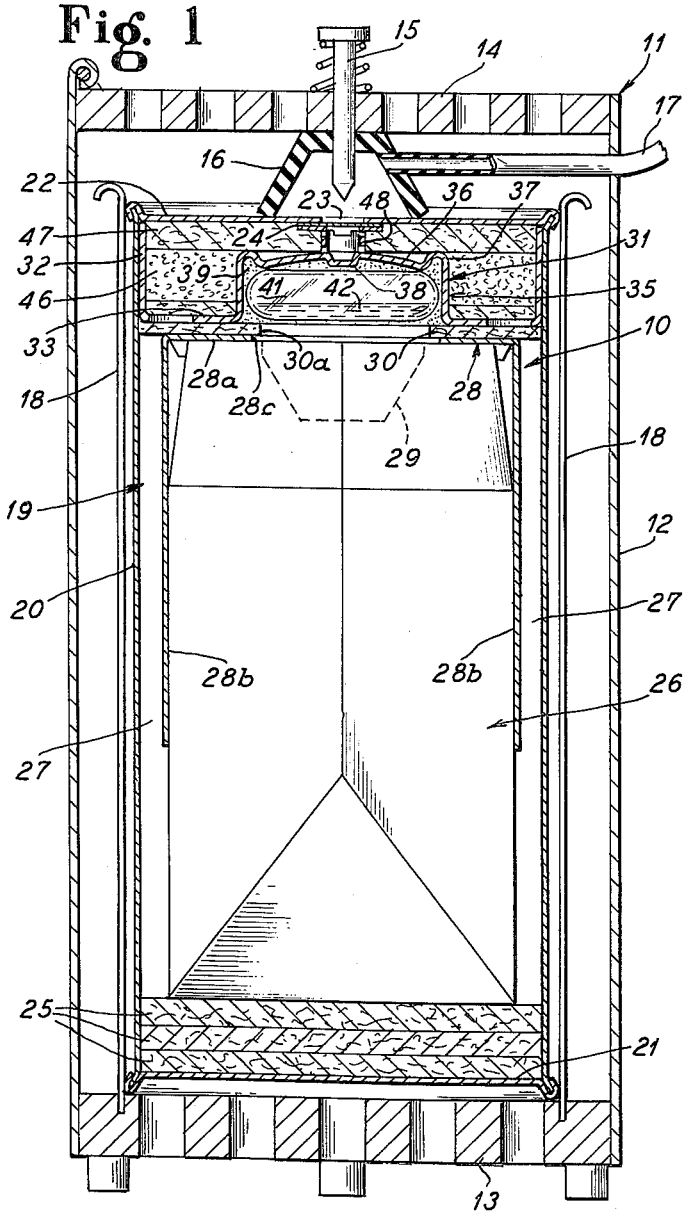
Fig. 1
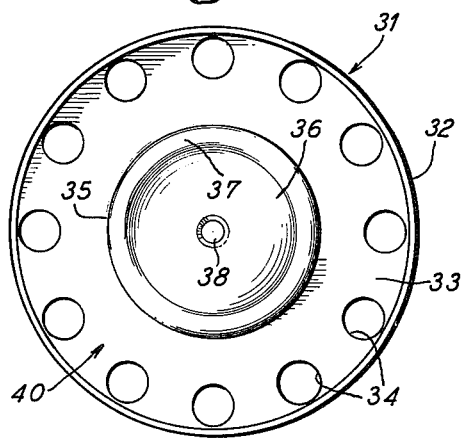
Fig. 2
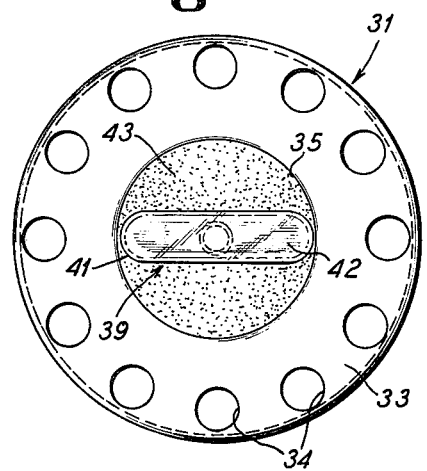
Fig. 3
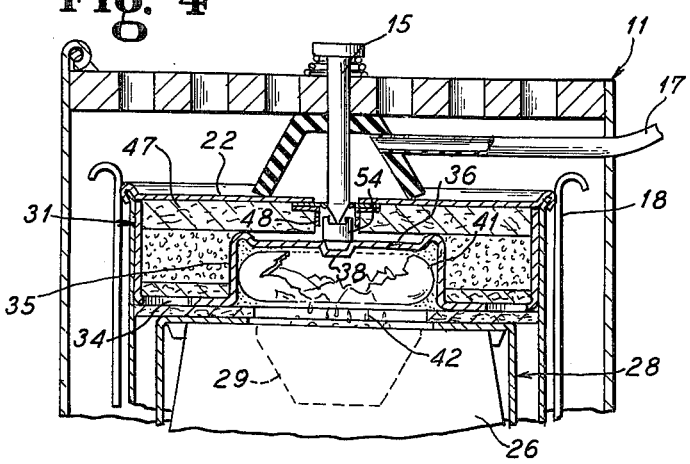
Fig. 4
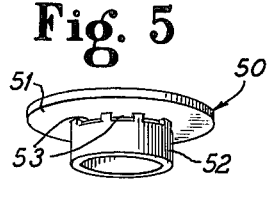
Fig. 5
Fig. 6

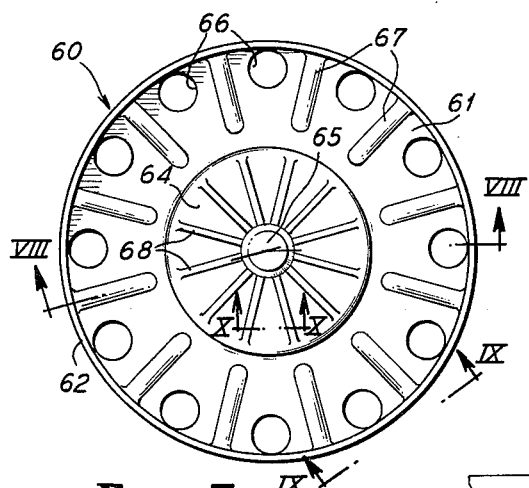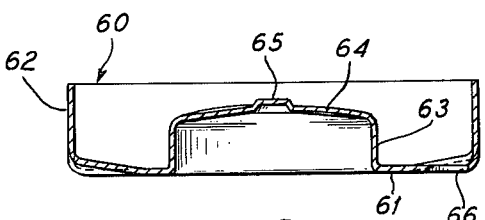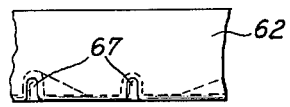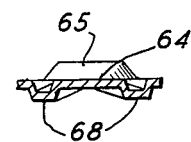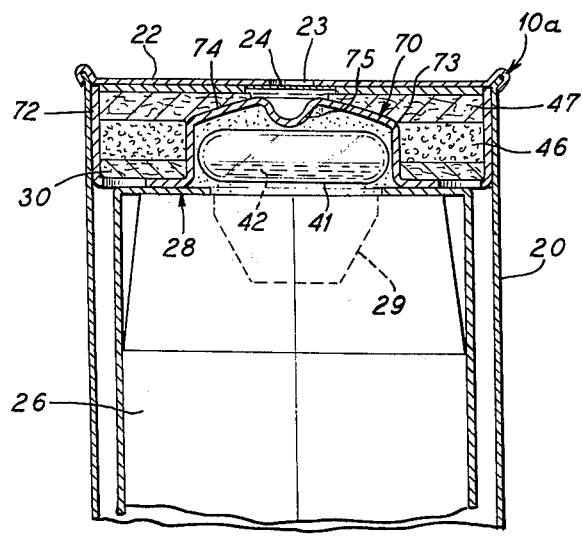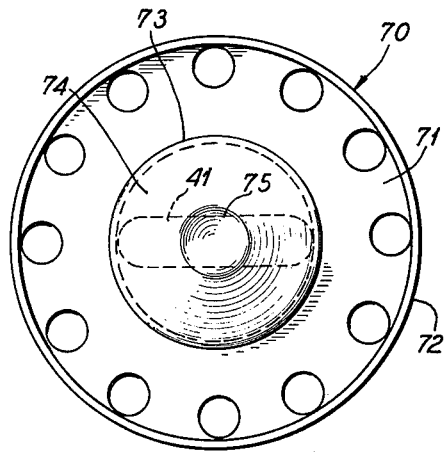

OXYGEN GENERATOR CELL

FIELD OF THE INVENTION

This invention relates to the art of chemical oxygen generator cells and particularly to disposable tin plated steel can cell units containing a chlorate candle, an ignition material, a sealed crushable container partially filled with a liquid to activate the ignition material and a protecting shock cap adapted to be deflected only when pushed by the starting button or pin of a dispenser unit into a depressed condition which will crush the sealed container and release the activating liquid to the ignition material.

PRIOR ART

Disposable "tin can" oxygen generator cell units containing a chlorate candle, an ignition material, and means for igniting the ignition material are known in the art, for example, in the Churchill and Thompson U.S Pat. No. 3,736,104 issued May 29, 1973; in the Thompson U.S Pat. No. 3,806,323 issued Apr. 23, 1974 and in the Thompson U.S. Pat No. 3,861,880 issued Jan. 21, 1975. FIG. 10 of U.S Pat. No. 3,736,104 illustrates a manner in which these cells can be inserted in a dispenser equipped with a push pin that is adapted to be depressed for activating the cell. The Thompson U.S. Pat. No. 3,702,305 issued Nov. 7, 1972 discloses and claims a chlorate candle composition suitable for such cells which maintains a self sustaining oxygen liberating reaction without added heat or fuel and the Thompson U.S. Pat. No. 3,725,156 issued Apr. 3, 1973 discloses and claims a water activated ignition composition suitable for use with this chlorate candle composition. The U.S. Pat. No. 3,806,323, in FIG. 1, illustrates a water filled glass vial adapted to be broken by a push pin to release the water to the ignition material for starting the burning of the chlorate candle. The U.S Pat. No. 3,861,880 illustrates a preferred candle shape and a baffle centering the candle in the "tin can" and providing a top compartment in the can for ignition material, filters and a water dispensing thimble.

SUMMARY OF THE INVENTION

This invention provides an improvement in the mounting and protecting of fracturable sealed vials, capsules, or ampouls containing liquid to activate the ignition material of disposable tin can chemical oxygen generator cell units of the type disclosed in the aforesaid patents while, at the same time, insuring crushing of the sealed vials, capsules or ampouls when a push pin actuator is pressed into the can. Specifically, the present invention provides a shock cup in the compartment between the baffle and the end wall of the cell unit disclosed in the aforesaid U.S. Pat. No. 3,861,880. The cup has a peripheral skirt snugly fitting the can and a raised central hat section with a spring diaphragm dome or top wall depressed with a snap action when its center is pushed by the activating push pin of a dispenser receiving the cell. The hat section portion of the cup provides an open bottom chamber communicating through an aperture in the end wall of the baffle with an ignition cone imbedded in the top end of the chlorate candle in the cell. This chamber is conveniently filled with a so-called "first fire" ignition composition such as disclosed in the above mentioned Thompson U.S Pat. No. 3,725,156. The shock cup also provides an open top annular chamber inside the skirt surrounding the central hat section which is conveniently filled with granular sodium peroxide and covered with a porous, resilient mat which is compressed between the peroxide filler and the top end wall of the can thereby providing a stack of ingredients which will firmly hold the shock cup in thrusting engagement with the top end of the candle.

The top end wall of the can containing the oxygen outlet orifice may suspend a cylindrical guide that slidably supports a spacer pin, engageable by the dispenser push pin, to depress the center of the domed part of the shock cup. The spring diaphragm part of the shock cup can thus be spaced appreciably from the end wall of the can and receive the resilient fibrous mat thereover without increasing the necessary length for the dispenser push pin.

To avoid use of the spacer pin the hat section may have a convex domed top closely adjacent to the end wall of the can.

The shock cup hat section has a dimple in the center of its top or dome which acts as a stress riser so that deformation of the spring diaphragm wall will take place with a snap action to distribute and deliver a crushing force which will insure releasing of all of the liquid from the ampoule. If the diaphragm wall were permitted to develop a peak stress only at the center area of the underlying vial or ampoule it is possible that the ampoule would merely crack without releasing all of its water content. The stress riser insures distribution of the stresses so that the ampoule will be sufficiently crushed to release all of its water.

The terms "ampoule", "vial", or "capsule" as used herein are intended to cover any sealed container that can be fractured by the shock cup of this invention.

A feature of this invention is to protect ampouls of chlorate candle type oxygen generator cells with a shock cup having a spring diaphragm wall which insures the crushing of the ampoule.

Another feature of the invention is the use of a metal shock cup with a cylindrical peripheral skirt snugly fitting the tin can housing of an oxygen generator cell and having a raised central hat section housing a water containing sealed vial or ampoule. The hat section has a snap spring top wall adapted to be depressed by a push pin of a dispenser receiving the cells so as to crush the ampoule and release the water to initiate burning of the chlorate candle.

It is then an object of this invention to increase the shock resistance of water activated oxygen generator chlorate candle type cells.

Another object of the invention is to provide a mounting for elongated sealed cylindrical glass vials containing an activating solution for a chlorate candle which mounting will protect the vial against inadvertent fracture and will insure the crushing of the vial when it is desired to activate the candle.

Another object of the invention is to provide a disposable tin plated steel can oxygen generator cell housing a chlorate candle, an ignition material for starting the burning of the candle, a fracturable sealed water containing vial for activating the ignition material, and a shock cup mounting the vial and providing a snap spring diaphragm to crush the vial when it is deliberately depressed by an actuating pin.

A further specific object of the invention is to increase the safety and efficiency of water actuated chlorate candle oxygen generator cells by protecting a water releasing vial against fracture under shock and impact loads and to insure a fracturing of the vial to release all of its contents at the proper time.

Other and further objects of this invention will become apparent to those skilled in this art from the following detailed description of the drawings which by way of preferred examples illustrates several embodiments of the invention.

ON THE DRAWINGS

FIG. 1 is a longitudinal cross sectional view of an oxygen generator cell according to this invention mounted in a push pin actuated dispenser unit;

FIG. 2 is a top plan view of the shock cup in the cell of FIG. 1;

FIG. 3 is a bottom plan view of the shock cup of FIG. 2 and illustrating the water containing ampoule in transverse section;

FIG. 4 is a longitudinal section of the upper portion of the cell and dispenser unit of FIG. 1 showing the push pin in the depressed position for crushing the ampoule;

FIG. 5 is a perspective view of the guide sleeve suspended from the top end wall of the cell of FIG. 1;

FIG. 6 is a perspective view of the pin slidable in the sleeve of FIG. 5;

FIG. 7 is a top plan view of another form of shock cup according to this invention;

FIG. 8 is a transverse section of the cup of FIG. 7 taken along the line VIII—VIII of FIG. 7;

FIG. 9 is an edge view of the cup taken along the line IX—IX;

FIG. 10 is a vertical cross sectional view taken along the line X—X of FIG. 7;

FIG. 11 is a fragmentary longitudinal sectional view of the top portion of a cell using a modified shock cup arrangement according to this invention; and FIG. 12 is a top plan view of the shock cup of FIG. 11 showing the ampoule in the central hat section thereof.

AS SHOWN ON THE DRAWINGS

In FIG. 1 the reference numeral 10 illustrates generally an oxygen generator cell unit of this invention. The unit 10 is mounted in a dispenser 11 which has a cylindrical side wall 12 surrounding the unit 10 in spaced concentric relation, a perforated bottom wall 13, a perforated top wall 14 adapted to be opened or removed, a push pin 15 slidably mounted in the top wall 14, a deformable cup seal 16 depending from the top wall 14 around the push pin 15, and an oxygen outlet tube 17 extending from the interior of the cup seal 16 to the exterior of the dispenser. Spring fingers 18 extending upwardly from the bottom wall 13 receive the unit 10 therein and hold it in spaced relation from the side wall 12 of the dispenser. It will be understood that the dispenser receives oxygen from the unit 10 through the outlet tube 17 after the push pin 15 has punctured a seal in the top end wall of the unit 10 and activated the chlorate candle in the unit.

The unit 10 includes a disposable tin plated steel can housing 19 with a cylindrical side wall 20, a closed bottom end wall 21 and a centrally apertured top end wall 22. This top end wall 22 has an orifice 23 in the center thereof sealed by a puncturable foil seal 24.

The bottom end wall 21 supports a stack of resilient fibrous mats 25 composed of refractory fibers such as fiberglass, glass wool or the like and a chlorate candle 26 rests on this stack of mats. The candle 26 is composed of compressed sodium or potassium chlorate admixed with an oxide of sodium or potassium to maintain a self sustaining catalytic decomposition liberating oxygen without additional heat or added fuel when the candle is ignited. Suitable formulations for the candle composition are disclosed in the Thompson U.S Pat. No. 3,702,305 issued Nov. 7,1972. The candle has a hexagonal cross sectional shape tapered at its top and bottom end as disclosed in the aforesaid Thompson U.S. Pat. No. 3,861,880. The apices of the candle may engage the side wall 20 of the can 19 while the flats of the candle are spaced from the can wall and provide oxygen passages 27 between the candle and wall of the can.

A metal baffle 28 has an apertured end wall 28a overlying the top end of the candle 26, snugly fitting the can wall 20, and as more fully explained in the aforesaid patent 3,861,880, the baffle has diametrically opposed depending legs 28b embracing flats of the candle 26 thus holding the candle centrally in the can.

The top end of the candle 26 has a central recess filled with ignition cone material 29 having a composition such as disclosed in the Thompson U.S Pat. No. 3,725,156 issued Apr. 3, 1973. The aperture 28c of the baffle end wall 28a registers with the ignition cone 29.

A porous filter paper disk 30 overlies the baffle end wall 28a composed of refractory fibers and has a central aperture 30a registering with the baffle aperture 28c. The disk 30 is of silicon dioxide or the like.

According to this invention a metal shock cup 31 is interposed between the disk 30 and the top end wall 22 of the can 10. This cup has a cylindrical upturned skirt 32 surrounding a flat bottom wall 33 and snugly fitted in the cylindrical side wall 20 of the can. The bottom wall 33 has a ring of perforations 34 therethrough adjacent the skirt 32. The central portion of the bottom wall 34 has a raised cylindrical hat section 35 with a spring diaphragm dome top wall 36. An upturned bead 37 connects the spring top wall 36 with the side wall of hat section 35. A depressed dimple 38 is formed in the central portion of the top wall 36 to form the aforementioned stress riser.

The cup 31 thus provides an open bottom central recess 39 in the hat section 35 surrounded by an open top annular chamber 40.

The open bottom chamber 39 is spanned by a sealed fracturable glass ampoule 41 partially filled with water 42 or an aqueous salt solution such as calcium chloride acting as an anti-freeze material. The vial or ampoule 41 has a cylindrical cross section and rounded ends. It spans substantially the entire diameter of the hat section 35 and is imbedded in a particulate first fire composition 43 which fills the recess 39. The ampoule is spaced from the stress riser 38, a layer of the first fire material 43 being provided between the ampoule and the spring end wall 36 and its stress riser dimple 38. The first fire material 43 rests on the ignition cone 29 of the candle 26. As discussed in the aforesaid Thompson U.S. Pat. No. 3,725,156, a first fire material 43 may have the following composition: $NaClO_3$ 18% by weight; $NaIO_3$ 38% by weight, $Na_2O$ 44% by weight. Of course considerable variations in this formulation can be made as discussed in the aforesaid U.S. Pat. No. 3,725,156.

The ignition cone material 29 when used with a first fire material can be a slower burning pyrotechnic material than the first fire material and as discussed in the aforesaid Thompson U.S Pat. No. 3,725,156 may have the following ingredients: $NaClO_3$ 90% by weight, Na₂O 6% by weight, Na₂O₂ 4% by weight or may be any of the compositions of Examples II–V of said patent.

The Chamber 40 is filled with granular sodium peroxide 46.

The interior of the cup 31 above the hat section 35 is filled with a compressible refractory fibrous mat 47 having a central hole 48 therethrough. It will be noted that the cup skirt 32 extends from the top wall 22 of the can to the disk 30 and since this disk rests on the baffle 28 which in turn rests on the candle 26 which in turn rests on the stack of mats 25 supported on the bottom wall 21 of the can, the entire stack of components is firmly held in end to end assembled relation.

Since the mat 47 overlies the domed top 36 of the hat section, to prevent the necessity for an elongated push pin 15, the underface of the top end wall 22 of the can supports a guide thimble 50 as best shown in FIG. 5. This thimble has a flat flange 51 soldered to the end wall 22 of the can through the seal 24 and a depending cylindrical collar 52 with a ring of openings 53 around the top end thereof just under the flange 51. The collar 52 fits in the hole 48 of the mat 47.

A cylindrical pin 54 shown in FIG. 6 slides in the collar 52 of the guide thimble 50 and has a transverse slot 55 across its top face registering with the openings 53 so that oxygen filtering through the mat 47 will escape to the outlet orifice 23 even when the pin 54 is bottomed on the top wall of the can or the seal secured to this top wall.

To activate the call unit 10, the push pin 15 of the dispenser 11 is manually depressed through the orifice 23 in the top end wall 22 of the can, first puncturing the seal 24, and then forcing the sliding pin 54 against the dimpled portion 38 of the top domed wall 36 of the shock cup 31. This forcing of the pin against this dimpled part of the top wall 36 will flex the bead 37 and snap the top wall against the ampoule 41 crushing it to release the water 42 for activating the first fire material 43 which in turn then activates the ignition cone material 29 and starts the burning of the candle 26. Oxygen from the candle will flow through the passages 27 between the can and candle, through the orifices 34 in the shock cup, (which orifices can be spaced, sized and shaped to accommodate the desired oxygen flow rate) then through the disk 30 and sodium peroxide 46 into the mat 47 from which it will flow through the openings 53 in the guide unit 50 to the outlet orifice 23 into the seal 16 and then to the outlet tube 17.

It will be appreciated that the shock cup 31 protects the glass ampoule 41 against inadvertent fracture when the can 10 is dropped or struck and insures fracturing of the ampoule to release all of its liquid only when a starting pin is depressed to snap the diaphragm top wall 36 against the ampoule. It will also be appreciated that depressing or denting of the end wall 22 of the can will not bring about a depressing of the spring diaphragm top wall 36 of this cup 31. The cup 31 can be made of any suitable metal which will provide a spring diaphragm top wall 36. Steel, brass and the like are useful.

In the embodiment of FIGS. 7 to 10 there is illustrated a modified shock cup 60 that may be substituted for the cup 31 described hereinabove. The cup 60 has a bottom wall 61, an upstanding cylindrical side wall or skirt 62, a central cylindrical hat section 63, a convex spring dome top wall 64, and a raised dimple 65 in the center of the wall 64. To permit passage of oxygen through the bottom 61 a ring of circular holes 66 is provided adjacent the skirt 62.

Radially extending embossed fingers 67 are formed in the bottom wall 61 of the cup 60 between the holes 66 to stiffen the wall 61 against deflection. These fingers 67 extend from the skirt 62 into spaced relation from the raised hat portion 63.

The top wall 64 of the hat portion also has embossed ridges or beads 68 extending from the peripheral side wall of the hat portion to the raised dimple or button 65. The embossments facilitate flexing of the domed top wall 64 to lessen the stiffness thereof against deflection toward a flat condition from the raised dome free state condition illustrated in FIG. 8.

The dimple or raised button 65 serves the "stress riser" function of the dimple 38 in the FIG. 1 embodiment but in addition serves to shorten the distance between the end wall 22 of the can and the spring dome top wall 64 of the shock cup thereby eliminating the necessity for the pin 54 between the push pin 15 and the deformable top wall of the hat section. The cup 60 functions in the same manner as the cup 31 without requiring the spacer pin 54.

In the embodiment of FIG. 11, a further modified cell unit 10a has parts identical with parts described in FIGS. 1 to 6 marked with the same reference numerals.

As shown in FIGS. 11 and 12 a shock cup 70 has the same bottom wall 71, peripheral skirt 72, cylindrical hat section 73 and spring diaphragm top end wall 74 as the cups 31 and 60 with modifications in the shape of the top wall 74. In the cup 70 this wall 74 is more convex than the walls 36 and 64 of the cups 31 and 60 and the dimple 75 is more rounded than the dimple 38 of the FIG. 1 embodiment. Because of the increased dome of the wall 74, the depressed dimple 75 can be provided in place of the raised dimple or button 65 of the cup 60 and at the same time avoid the necessity for the spacer pin 54 as in FIG. 1 modification. The cup 60 acts in the same manner as the cups 31 and 60.

From the above descriptions it will, therefore, be understood that this invention provides insert shock cups for tin can type chlorate candle oxygen generator cells to protect a fracturable sealed ampoule or vial containing a candle activating liquid against breakage regardless of the rough treatment received by the cell prior to use and to insure crushing of the ampoule or vial to release all of the liquid for burning the chlorate candle only when a push button pin of an oxygen generator dispenser is deliberately depressed to activate the cell.

I claim as my invention:

1. In a chemical oxygen generator having a can with an outlet orifice for discharging oxygen, a seal closing said orifice, a water initiatable ignition composition in said can, a chlorate candle in said can activated by said composition, a fracturable water containing sealed means in said can associated with said composition, and means accessible from outside of said can to fracture said sealed means for igniting said ignition composition to activate said chlorate candle for releasing oxygen to said outlet orifice for discharging the oxygen from the can when said seal is broken, the improvement which comprises a deformable spring diaphragm in said can overlying the sealed means and adapted to be depressed by said means accessible from outside of the can to crush the sealed means only when deformed and said diaphragm having a recess receiving and protecting the sealed means against fracture from impacts or shocks encountered by the can.

2. An oxygen generator cell which comprises a can having an end wall with a sealed outlet orifice, a chlorate candle in said can, a cup in said can overlying said candle between the orificed end wall of the can and the candle, said cup having a peripheral skirt snugly engaging the side wall of the can, a bottom wall with apertures therein allowing flow of oxygen from the candle through the cup, a central raised hat section on said bottom wall of the cup having a deformable top wall, a glass water containing ampoule in said hat section of the cup, ignition material filling said hat section around said ampoule, and said deformable top wall of the hat portion being depressable to crush the ampoule and release the water to the ignition material.

3. A device for protecting and crushing a liquid containing fracturable ampoule in a chlorate candle oxygen generator cell having a metal can housing which comprises a metal cup having a peripheral skirt snugly fitting the can, an apertured bottom wall, a raised central hat section on said wall spaced inwardly from said skirt and defining an open bottom recess adapted to receive said ampoule, a spring diaphragm top wall on said hat section, and an embossed central dimple in the center of the diaphragm top wall adapted to be depressed for deforming the spring diaphragm top wall into the recess for crushing an ampoule in the recess.

4. The generator of claim 1 wherein the spring diaphragm is an integral portion of a metal cup snugly fitting said can.

5. The generator of claim 4 wherein the cup has a domed top over the recess adapted to be depressed with a snap action to fracture a sealed means in the recess.

6. The generator of claim 5 wherein the recess is filled with ignition material around the sealed means.

7. The generator of claim 6 wherein the sealed means is an elongated glass ampoule spanning said recess.

8. The generator of claim 1 wherein the diaphragm is engaged by a slidable pin in the can.

9. The generator of claim 8 wherein the outlet orifice is in an end wall of the can and the slidable pin rides in a guide depending from said orificed end wall of the can.

10. The generator of claim 2 wherein the cup has an annular open top chamber between the skirt and hat sections.

11. The generator of claim 10 wherein the chamber is filled with a granular material.

12. The generator of claim 11 wherein the granular material is sodium peroxide.

13. The generator of claim 2 including a slidable pin in the can bottomed on the deformable top wall.

14. The generator of claim 2 wherein the deformable top wall is surrounded by a flexible bead rim and is deformed with a snap action.

15. The generator of claim 2 wherein the deformable top wall is domed and snaps to a flattened shape when deformed.

16. The generator of claim 15 wherein the domed wall has a central embossed stress riser dimple.

17. The generator of claim 2 wherein the ampoule is an elongated cylinder with rounded ends.

18. The device of claim 3 wherein the top wall is domed and snaps to a flattened position when the dimple is depressed.

19. The device of claim 3 wherein the bottom wall has radial embossed fingers between the skirt and hat section.

20. The device of claim 3 wherein the top wall has radial embossed fingers around the dimple.

* * * * *